US009674741B2

(12) United States Patent
Zhang et al.

(10) Patent No.: US 9,674,741 B2
(45) Date of Patent: Jun. 6, 2017

(54) NETWORK SIDE DEVICE AND MACRO BASE STATION-TO-MICRO BASE STATION SWITCHING METHOD

(71) Applicant: ZTE CORPORATION, Shenzhen, Guangdong Province (CN)

(72) Inventors: Bo Zhang, Shenzhen (CN); Jianwu Dou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 7 days.

(21) Appl. No.: 14/763,169

(22) PCT Filed: Sep. 16, 2013

(86) PCT No.: PCT/CN2013/083550
§ 371 (c)(1),
(2) Date: Jul. 24, 2015

(87) PCT Pub. No.: WO2014/114096
PCT Pub. Date: Jul. 31, 2014

(65) Prior Publication Data
US 2015/0365858 A1   Dec. 17, 2015

(30) Foreign Application Priority Data
Jan. 28, 2013  (CN) .......................... 2013 1 0032242

(51) Int. Cl.
*H04W 4/00* (2009.01)
*H04W 36/00* (2009.01)
*H04W 56/00* (2009.01)

(52) U.S. Cl.
CPC ... *H04W 36/0083* (2013.01); *H04W 36/0016* (2013.01); *H04W 56/001* (2013.01)

(58) Field of Classification Search
None
See application file for complete search history.

(56) References Cited

U.S. PATENT DOCUMENTS

| 8,797,975 B2 * | 8/2014 | Maida .................. H04W 24/02 |
| | | 370/310 |
| 2010/0093358 A1 | 4/2010 | Cheong et al. |
| 2012/0309394 A1 | 12/2012 | Radulescu et al. |

FOREIGN PATENT DOCUMENTS

| CN | 102132605 A | 7/2011 |
| CN | 102577509 A | 7/2012 |
| EP | 1983786 A1 | 10/2008 |
| WO | 2008088592 A1 | 7/2008 |

OTHER PUBLICATIONS

On the clarifications for 3G Marco to Femto hand-in solutions for non-CSG UEs; Qualcomm Incorporated; 3GPP TSG-RAN WG2 meeting #77-BIS, Jeju, South Korea, Mar. 26-30, 2012. R2-121703.

* cited by examiner

*Primary Examiner* — Willie J Daniel, Jr.
(74) *Attorney, Agent, or Firm* — Ling Wu; Stephen Yang; Ling and Yang Intellectual Property

(57) ABSTRACT

A network-side device and a macro base station to micro base station switching method relate to a universal mobile telecommunications system. The method includes: multiplexing part of scrambling codes in reserved scrambling codes to micro base station cells, and configuring them to a user equipment; a network side creating a SNF–SFN relation list between various base station cells according to existing determined neighbor cell relations and cell synchronization information in a measurement report by the user equipment; when the user equipment reports a switching measurement report of a target cell, the network side determining a target cell in actual switching and performing the switching according to the scrambling code information in the switching measurement report, TM and OFF information in the cell synchronization information and the SFN–SFN relation list. The embodiment of the present invention further discloses a network-side device.

18 Claims, 5 Drawing Sheets

NETWORK SIDE DEVICE AND MACRO BASE STATION-TO-MICRO BASE STATION SWITCHING METHOD

TECHNICAL FIELD

The present document relates to the field of UMTS (Universal Mobile Telecommunications System) communications, and more particularly, to a solution of switching between a macro base station and a micro base station as well as a micro base station and a micro base station in the network.

BACKGROUND OF THE RELATED ART

With popularization of the UMTS technology, various high-speed wireless applications become popular. Public demand for high-speed data services is growing. With the continued development of services and changes in users' application services, according to some survey results, about 30% of services are used in the family area, and about 35% of the services are used in companies, restaurants and other indoor scenarios. Therefore, the quality of indoor coverage will largely affect the experience of the users using the services, but in these scenarios, because the traditional macro base stations generally use the 2.1 GHz frequency band resources, the transmission loss and space loss are relatively large, and the capability of passing through the building wall is relatively weak, which may cause poor indoor coverage quality. Also for hot spots, such as business districts, subway stations and other areas where there are a large number of people and the demand for communications is very large, the capacity is also prone to be limited due to reasons such as site selection of the macro base stations and the costs, thus affecting the user service experience. In view of these situations, the micro base station solution is introduced to deal with this type of scenarios, on the one hand to supplement the coverage of the macro base stations to improve the quality of indoor coverage and the user service experience, and on the other hand to shunt the services of the macro network to relieve the traffic pressure of the macro network.

The main features of the micro base station comprises low transmit power, small coverage, small size, and flexible application. Based on these features, with respect to the networking mode of the macro base station, there may be a large number of micro base stations in a local area. In the definition of measurement control in the 3GPP (The 3rd Generation Partnership Project) protocol, only a maximum of 31 neighbor cells can be carried. When there is a large number of micro base stations, the number of neighbor cells of a macro base station/micro base station is likely to exceed the restriction on the number of neighbor cells in the measurement control, especially, the number of neighbor micro base stations under the jurisdiction of a macro base station may far exceed the restriction on the number of neighbor cells, therefore when sending the measurement control, it is unable to determine the appropriate neighbor cell, leading to a decreased mobility and even a call drop. To address this issue, in R8 (Release 8) and later versions, the 3GPP introduced some strategies, such as the CSG (Closed Subscriber Group) cell, the UE (User Equipment) assisted ANR Logging Measurement reporting and so on, but the problem still exists in hundreds of millions of UEs prior to the R8 versions in the existing network.

SUMMARY OF THE INVENTION

To solve the technical problem, the present document provides a network-side device and a macro base station to micro base station switching method to overcome the problem of decreased mobility and even call drop because a traditional UE cannot determine a reasonable switching neighbor cell when a lot of micro base stations are networking together and the number of neighbor cells exceeds the maximum one defined in the protocol.

To solve the abovementioned technical problem, the present document discloses a macro base station to micro base station switching method, comprising:

multiplexing part of scrambling codes in reserved scrambling codes to micro base station cells and configuring the multiplexed scrambling code information to a user equipment;

in accordance with existing determined neighbor cell relations as well as cell synchronization information in a measurement report reported by the user equipment, a network side creating a system frame number-system frame number (SFN-SFN) relation list between various base station cells, wherein the created SFN-SFN relation list comprises SFN-SFN offsets between macro base stations and micro base station cells as well as micro base stations and micro base station cells;

when the user equipment reports a switching measurement report of a target cell, the network side determining a target cell in actual switching and performing a corresponding switching action according to scrambling code information in the switching measurement report, TM and OFF information in the cell synchronization information and the SFN-SFN relation list.

Preferably, in the abovementioned method, the network side configures the scrambling code information multiplexed by various micro base station cells to the user equipment when filling in the neighbor cell measurement control.

Preferably, in the abovementioned method, the network side creating a SFN-SFN relation list between macro base stations and micro base station cells in accordance with the existing determined neighbor cell relations and the cell synchronization information in the measurement report reported by the user equipment refers to:

the network side creating and updating the SFN-SFN relation list between the macro base stations and the micro base station cells in accordance with the determined neighbor cell relations between cells and the TM and OFF information in the target cell synchronization information in the measurement report reported by the user equipment.

Preferably, in the abovementioned method, when the network side creating and updating the SFN-SFN relation list between the macro base stations and the micro base station cells, the SFN-SFN offset between every two cells is calculated according to the following equation:

$$\text{Frame Offset}_{source} + \text{Chip Offset}_{source} = (\text{SFN}_{source} - \text{CFN}) \bmod 256 \text{ frames [chips]}$$

$$\text{OFF}_{Target} + Tm_{Target} = (\text{SFN}_{target} - \text{CFN}) \bmod 256 \text{ frames [chips]}$$

wherein the subscript Source refers to a resident cell which currently initiates services, and the subscript Target refers to a target cell obtained from the measurement.

Preferably, in the abovementioned method, the process of the network side determining the target cell in actual switching according to the scrambling code information in the switching measurement report, the TM, OFF information in the cell synchronization information, as well as the SFN-SFN relation list is as follows:

composing cells corresponding to the value of scrambling code into a cell list according to the value of scrambling code in the measurement report reported by the user equipment;

calculating a SFN–SFN difference between the target cell and the source cell according to the values of TM and OFF of the target cell in the switching measurement report reported by the user equipment;

calculating SFN time differences between various cells in the cell list and source cell Cell2, and determining cells which meet the following condition as the target cell in actual switching:

$$|(SFN_{Target}-SFN_{Source})-(TargetCell_{SFN}-SourceCell_{SFN})|<DeltaFrame$$

wherein $SFN_{Target}-SFN_{Source}$ is the SFN difference between the target cell and the source cell calculated according to the TM and OFF in the real-time measurement report;

$TargetCell_{SFN}-SourceCell_{SFN}$ is the SFN difference inquired by each candidate target cell in the cell list and source cell according to the SFN–SFN list;

DeltaFrame is the configured allowed SFN time difference.

Preferably, the abovementioned method further comprises:

after composing the cells corresponding to the value of scrambling code into a cell list according to the value of scrambling code in the measurement report reported by the user equipment, the network side calculating relative distances according to cell position information of the existing network and removing the cells which do not meet a relative distance condition from the cell list, and then calculating SFN time difference between the source cell Cell2 and the remaining cells in the cell list.

Preferably, in the abovementioned method, when calculating the SFN–SFN difference between the target cell and the source cell according to the values of TM and OFF of the target cell in the switching measurement report reported by the user equipment, if the target cell and the source cell have a direct relation, it is to directly take the SFN difference of the target cell and the source cell saved in the SFN–SFN list; if the target cell and the source cell do not have a direct relation, it is to calculate the SFN difference of the target cell and the source cell according to the shortest path method in the network topology.

Preferably, in the abovementioned method, the number of the scrambling codes and the scrambling codes multiplexed to various micro base station cells are different.

Preferably, in the abovementioned method, the number of scrambling code multiplexed to the micro base station cells is greater than 31.

The present document further discloses a network-side device, comprising:

a first module, configured to: multiplex part of scrambling codes in reserved scrambling codes to micro base station cells, and configure multiplexed scrambling code information to a user equipment;

a second module, configured to: create a SFN–SFN relation list between various base station cells according to existing determined neighbor cell relations and cell synchronization information in a measurement report reported by the user equipment, wherein the created SFN–SFN relation list comprises SFN–SFN offsets between macro base stations and micro base station cells as well as micro base stations and micro base station cells;

a third module, configured to: when the user equipment reports a switching measurement report of a target cell, determine a target cell in actual switching and perform a corresponding switching action according to scrambling code information in the switching measurement report, TM and OFF information in the cell synchronization information, as well as the SFN–SFN relation list.

Preferably, in the abovementioned network-side device, the first module is configured to: configure scrambling code information multiplexed by various micro base station cells to the user equipment when filling in a neighbor cell measurement control.

Preferably, in the abovementioned network-side device, the second module is configured to create a SFN–SFN relation list between macro base stations and micro base station cells in accordance with the existing determined neighbor cell relations and the cell synchronization information in the measurement report reported by the user equipment refers to:

the second module creating and updating the SFN–SFN relation list between the macro base stations and the micro base station cells in accordance with the determined neighbor cell relations between cells and the TM and OFF information in the target cell synchronization information in the measurement report reported by the user equipment.

Preferably, in the abovementioned network-side device, the second module is configured to: when creating and updating the SFN–SFN relation list between the macro base stations and the micro base station cells, calculate SFN–SFN offsets between every two cells according to the following equation:

$$\text{Frame Offset}_{source}+\text{Chip Offset}_{source}=(SFN_{source}-CFN)\bmod 256 \text{ frames [chips]}$$

$$OFF_{Target}+Tm_{Target}=(SFN_{target}-CFN)\bmod 256 \text{ frames [chips]}$$

wherein the subscript Source refers to a resident cell which currently initiates services, and the subscript Target refers to a target cell obtained from the measurement.

Preferably, in the abovementioned network-side device, the process of the third module being configured to determine a target cell in actual switching according to the scrambling code information in the switching measurement report, the TM, OFF information in the cell synchronization information as well as the SFN–SFN relation list is as follows:

composing cells corresponding to the value of scrambling code into a cell list according to the value of scrambling code in a measurement report reported by the user equipment;

calculating a SFN–SFN difference between the target cell and the source cell according to the values of TM and OFF of the target cell in the switching measurement report reported by the user equipment;

calculating SFN time differences between the source cell Cell2 and various cells in the cell list, and determining the cells which meets the following condition as the target cell in actual switching:

$$|(SFN_{Target}-SFN_{Source})-(TargetCell_{SFN}-SourceCell_{SFN})|<DeltaFrame$$

wherein $SFN_{Target}-SFN_{Source}$ is the SFN difference between the target cell and the source cell calculated according to the values of TM and OFF in the real-time measurement report;

$TargetCell_{SFN}-SourceCell_{SFN}$ is the SFN difference inquired by each candidate target cell in the cell list and source cell according to the SFN–SFN list;

DeltaFrame is the configured allowed SFN time difference.

Preferably, in the abovementioned network-side device, the third module is further configured to: after composing the cells corresponding to the value of scrambling code into a cell list according to the value of scrambling code in the measurement report reported by the user equipment, calculate relative distances according to the cell position information in the existing network and remove cells which do not meet the relative distance condition from the cell list, and then calculate the SFN time difference between the source cell Cell2 and remaining cells in the cell list.

Preferably, in the abovementioned network-side device, the third module is further configured to, when calculating the SFN–SFN difference between the target cell and the source cell according to the values of TM and OFF of the target cell in the switching measurement report reported by the user equipment, if the target cell and the source cell have a direct relation, directly take the SFN difference of the target cell and the source cell saved in the SFN–SFN list; if the target cell and the source cell do not have a direct relation, calculate the SFN difference of the target cell and the source cell according to the shortest path method in the network topology.

Preferably, in the abovementioned network-side device, the number of the scrambling codes and the scrambling codes multiplexed by the first module to various micro base station cells are different.

Preferably, in the abovementioned network-side device, the number of scrambling codes multiplexed by the first module to the micro base station cells is greater than 31.

Compared with the prior art, the technical solution of the present application can correctly identify the specific target cell in switching by multiplexing scrambling codes and creating the SFN–SFN list information between cells when there is a relatively large number of neighbor cells, thus achieving the mobile continuity.

PREFERRED EMBODIMENTS OF THE INVENTION

Hereinafter, in conjunction with the accompanying drawings, the technical solution of the present document will be further described in detail. It should be noted that, in the case of no conflict, embodiments and features in the embodiments of the present application may be arbitrarily combined with each other.

The First Embodiment

Figure 1:
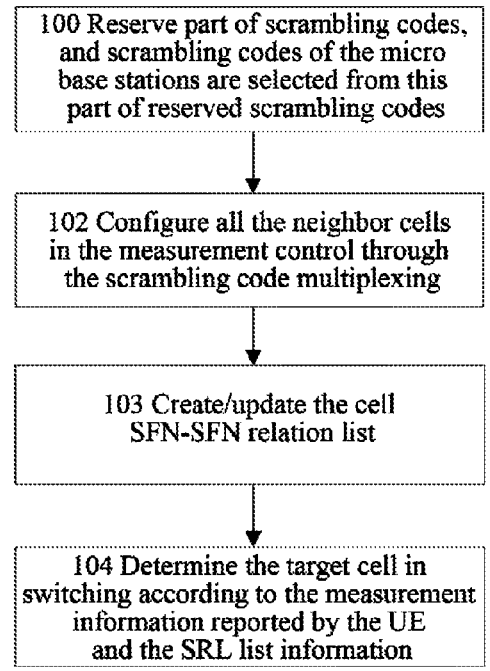
FIG. 1 is a flow chart of a macro base station to micro base station switching in accordance with the present embodiment.

The present embodiment provides a macro base station to micro base station switching method, and the method is shown in FIG. 1, comprising the following steps 101-104.

In step 101, it is to reserve part of scrambling codes, and scrambling codes of the micro base stations are selected from this part of reserved scrambling codes.

In this step, the number of reserved scrambling codes may not be limited to the restricted number of neighbor cells defined in the 3GPP protocol, that is, the neighbor cells which exceed the restriction of 31 can be reported by way of the detected set.

In addition, for each micro base station, the different number of scrambling codes and different scrambling codes may be reserved.

In step 102, the network side configures the multiplexed scrambling code information to the UE.

Specifically, the network can configure the multiplexed scrambling code information to the UE when filling in the neighbor cell measurement control. Because only the scrambling codes are filled in the neighbor cell information in the measurement control, when filling in the scrambling codes reserved in step 101 into the measurement control and configuring them to the UE, each configured reserved scrambling code represents a plurality of neighbor cells with the same scrambling code.

In step 103, the network side creates the SFN–SFN relation list between various cells (including the macro base stations and the micro base station cells, as well as the micro base stations and the micro base station cells) according to the determined neighbor cell relations as well as the TM and OFF information in the Cell Synchronization Information in the measurement report reported by the UE.

In this step, the network side searches for the synchronization information of neighbor cell measured and reported by UE in accordance with the determined neighbor cell relations in the existing network.

Figure 2:
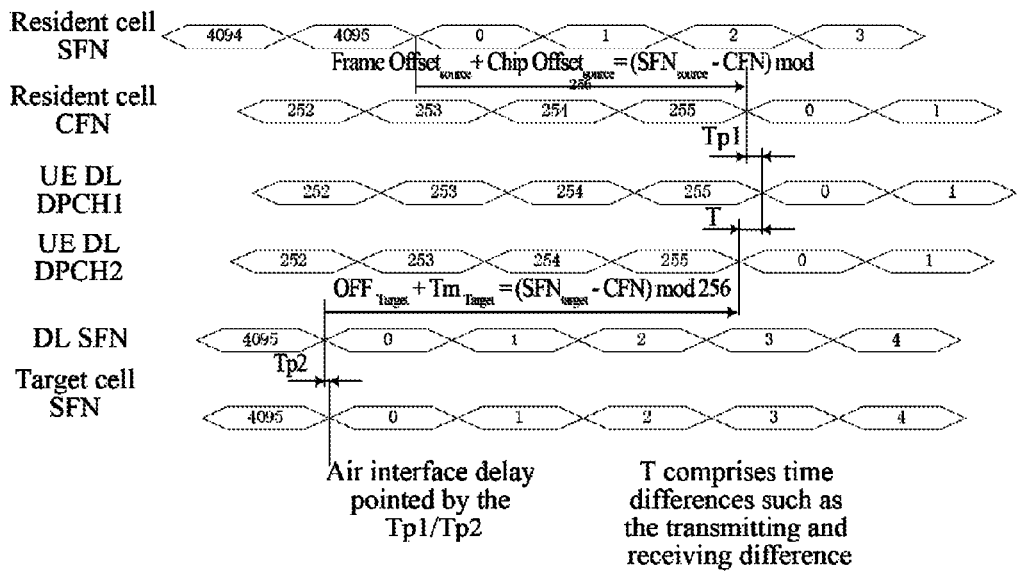
FIG. 2 is a schematic diagram of a SFN–SFN offset calculation in accordance with the present embodiment; wherein when softly adding a link, for the air interface synchronization between the cells and UE, the SFN–SFN offset between two cells is calculated according to the Frame Offset, the Chip Offset and the TM, OFF.

The SFN–SFN offset between two cells may be calculated through the value of Frame Offset of the source cell and the TM, OFF information of the neighbor cell measured by the UE, and its principle is shown as the SFN–SFN offset in FIG. 2, and the following equations (1) and (2) can be obtained:

$$\text{Frame Offset}_{source} + \text{Chip Offset}_{source} = (\text{SFN}_{source} - \text{CFN}) \bmod 256 \text{ frames [chips]} \quad \text{Eq. (1)}$$

$$\text{OFF}_{Target} + Tm_{Target} = (\text{SFN}_{target} - \text{DL DPCH}) \bmod 256 \text{ frames [chips]} \quad \text{Eq. (2)}$$

In FIG. 2, since Tp1/Tp2, T offsets are relatively small, these offset values are ignored in the calculation, that is, the above equation (2) is equivalent to the equation (3)

$$\text{OFF}_{Target} + Tm_{Target} = (\text{SFN}_{target} - \text{CFN}) \bmod 256 \text{ frames [chips]} \quad \text{Eq. (3)}$$

The subscript Source in the abovementioned equations (1) to (3) refers to the resident cell which currently initiates the services, and the subscript Target refers to the target cell obtained from the measurement.

Then, by collecting and calculating the above information, it can be obtained that as long as one cell has a definite neighbor cell relation with one known cell in the SFN–SFN relation list, the cell can be added into the SFN–SFN relation list, similarly, SFN–SFN offsets between the cell and all other cells in the existing network can be calculated.

It should be noted that, the accuracy of the crystal oscillator in the NodeB will result in a clock drift to a certain extent, and in order to avoid the asynchronization between NodeBs caused by the clock drift, after initially creating the SFN-SFN relation list between cells in the existing network, it still needs to recalculate after obtaining the UE measurement report of the known cells in order to update the SFN-SFN relation list.

In step 104, when the UE reports the switching measurement report of the target cell, the network side determines the target cell in actual switching according to information (including the scrambling codes, the values of TM and OFF of the target cell) carried in the measurement report as well as the existing SFN-SFN list information, and then it performs the corresponding switching action.

The specific implementation of the step is as follows:

A. inquiring through the background network management database according to the value of scrambling code reported in the UE measurement report, and composing the cells with the scrambling code meeting the condition into a cell list CCL (Candidate Cell List);

B. calculating the SFN-SFN difference (SFNtarget−SFNsource) of the target cell and the source cell through the abovementioned equations (1) to (3) according to the values of TM and OFF of the target cell reported in the measurement report;

C. for each cell in the CCL list, according to the SFN-SFN list in maintenance, deciding according to the following equation (4), determining the cell which meets the following condition as the target cell in actual switching, and performing the switching operation.

$$|(SFN_{Target}-SFN_{Source})-(TargetCell_{SFN}-SourceCell_{SFN})|<DeltaFrame \quad \text{eq. (4)}$$

wherein the $SFN_{Target}-SFN_{Source}$ is the SFN difference between the source cell and the target cell calculated according to the TM and OFF in the real-time measurement report;

$TargetCell_{SFN}-SourceCell_{SFN}$ is the SFN difference inquired by each candidate target cell in the CCL and source cell according to the SFN-SFN List (SRL List);

DeltaFrame is the configured allowed SFN time difference.

Furthermore, if the cell position information in the existing network can be obtained, when operating in A, by calculating the relative distances, the cells which do not meet the relative distance condition (calculated relative distance>configured distance threshold (calculated according to the cell coverage range), that is, the cell is impossible to be a neighbor cell) are first removed from the CCL list to reduce the range of subsequent cells. That is, it to first narrow the range of candidate cells, and then perform operations of steps B and C to determine the target cell in actual switching.

It should also be noted that when calculating TargetCellSFN−SourceCellSFN in step C, if the target cell and the source cell have a direct relation, it is to directly take the SFN difference of the both parties saved in the SFN-SFN list; if the target cell and the source cell do not have a direct relation, it is to calculate the SFN difference of the both parties on the basis of the shortest path method in the network topology.

In the following, specific application scenarios will be used to describe the implementation process of the abovementioned method.

Figure 3:
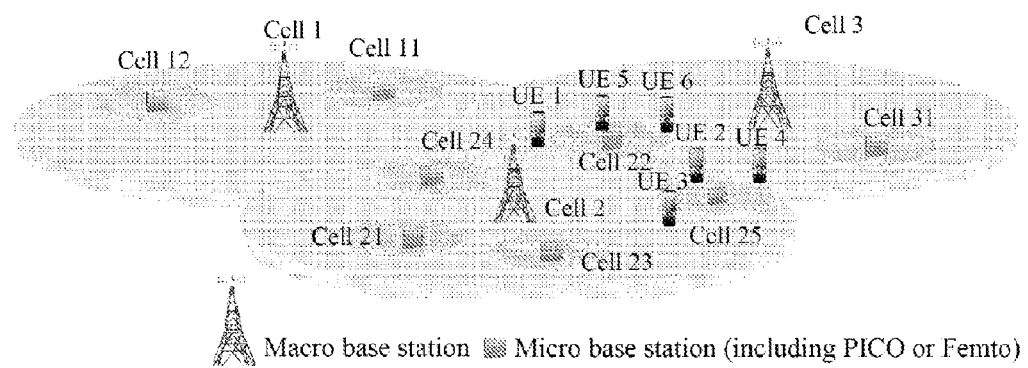
FIG. 3 is a schematic diagram of a networking in the present embodiment.

The First Scenario:

The networking architecture of this scenario is shown in FIG. 3, and the presetting is described as follows:

macro cells 1,2,3
micro cells 11,12,21,22,23,24,25,31
determined neighbor cell relations: 1,2,3 are mutually neighbor cells; 1 is a neighbor cell of 11 and 12; 2 is a neighbor cell of 21,22,23,24,25; and 3 is a neighbor cell of 22,25,31.

Delta Frame: 1 frame (10 ms)

Figure 4:
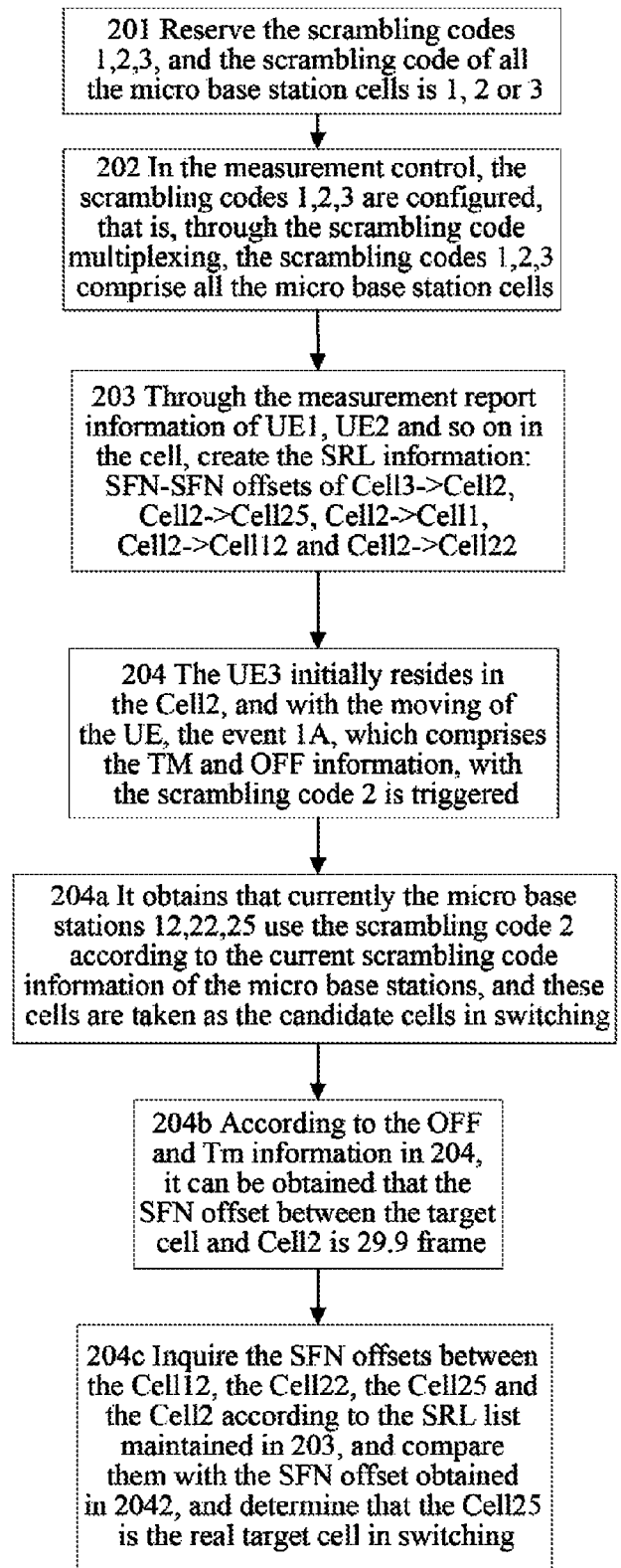
FIG. 4 is a flow chart of the cell switching in a first scenario.

Specifically, in the present scenario, it is to make a judgment on the target cell in switching according to direct SFN-SFN offsets between the cells, and the cell switching process is shown in FIG. 4 and comprises the steps of 201-204.

In step 201, according to the schematic diagram of networking of this scenario, it is to reserve the scrambling codes PSC 1,2,3. All the micro base stations select the scrambling codes in the reserved scrambling code section when establishing cells. After the establishment of micro base station cells is finished, wherein the cells 11,21,24,31 multiplex the scrambling code 1; the cells 12, 22, 25 multiplex the scrambling code 2; and the cell 23 multiplexes the scrambling code 3.

In step 202, for the macro cells, when filling in the neighbor cells of the measurement control, the scrambling codes 1,2,3 are filled in the neighbor cell list. With respect to the macro cell 1, it is equivalent to comprising the micro base station neighbor cells 11 and 12; for the macro cell 2, it is equivalent to comprising the micro base station neighbor cells 21,22,23,24,25; for the macro cell 3, it is equivalent to comprising the micro base station neighbor cells 22,25, 31.

In step 203, according to the determined neighbor cell relations as well as statistics of the UE measurement reports in a certain period of time, the SFN-SFN offset table of the neighbor cell can be obtained.

In this step, it is to take the UE behavior for example to illustrate the specific process of creating the SFN-SFN offset table of neighbor cell, and the process comprises the following 203a to 203c.

In 203a, when establishing the first link in the macro cell Cell 2, the UE1 obtains that Frame Offset=1 frame and Chip Offset=11776chip through the node synchronization. The UE1 reports information of the macro cell Cell3, which carries the synchronization information OFF=25, Tm=35575, and it can be obtained according to the equation in step 103 that the SFN difference of Cell3->Cell2 is 24frame+23799chip, which is rounded to 24.620frame.

In 203b, when establishing the first link in the micro cell Cell 25, the UE2 obtains that Frame Offset=55 frame and Chip Offset=15521. The UE2 reports information of the macro cell Cell2, which carries the synchronization information OFF=25, Tm=10752, and it can be obtained according to the equations (1) (2) (3) that the SFN difference of Cell2->Cell25 is −(30frame+4769chip), which is rounded to −30.124frame.

The same principle can be used to obtain that the SFN difference of Cell2->Cell1 is 132.882frame, the SFN difference of Cell2->Cell12 is 85.119 frame, and the SFN difference of Cell2->Cell22 is −148.968frame.

In 203c, according to the measurement report reported by UE under the jurisdiction of the network, the Table 1 can be obtained as follows:

Table 1 is a SFN-SFN offset table of neighbor cells in the first scenario

|  | SFN-SFN offset |
|---|---|
| Cell3->Cell2 | 24.620 |
| Cell2->Cell25 | −30.124 |
| Cell2->Cell11 | 132.882 |
| Cell2->Cell12 | 85.119 |
| Cell2->Cell22 | −148.968 |

In step 204, the UE3 shown in FIG. 3 initially resides in the Cell2, then initiates a service, when establishing the first link, Frame Offset=1 frame, Chip Offset=11776. With the moving of the UE, the event 1A is triggered, and the corresponding scrambling code 2 as well as the synchronization information OFF=30 and Tm=11373 are reported. The RNC side determines the target cell in actual switching according to the information, and then performs the corresponding switching action.

In the present embodiment, the scrambling code reported by the UE3 is 2, and a plurality of cells at this time multiplex the scrambling code 2, therefore, the RNC side cannot identify specifically which cell triggers the measurement report. In view of this, a judgment is performed according to the following steps:

in 204a, because the cells 12,22,25 multiplex the scrambling code 2, it is to compose these cells into a candidate cell list.

in 204b, according to the OFF and Tm information of the cell currently reported, it can be obtained that the SFN offset of the target cell and Cell2 is 29.99frame, that is the SFN offset of Cell2->target cell is −29.99frame.

In 204c, according to the results in Table 1 and the step 204b, it is to obtain the SFN offset of the Cell2 and the target cell, and according to the equation (4), the calculation result of each cell is as shown in Table 2:

Table 2 is a list of DeltaFrame between various candidate cells and the source cell Cell2 in the scenario

|  | \|(SFN Target-SFN Source)-(TargetCellSFN-SourceCellSFN)\| | Is it less than DeltaFrame (1Frame)? |
|---|---|---|
| Cell12 | 115.109 | No |
| Cell22 | 118.978 | No |
| Cell25 | 0.224 | Yes |

As can be seen from Table 2, only the Cell25 meets the condition, and it can be determined as the actual target cell. Then the network side initiates the Cell2->Cell25 switching action.

The Second Scenario:

The networking architecture of this scenario is shown in FIG. 3, and the presetting is described as follows:

macro cells 1,2,3 micro cells 11,12,21,22,23,24,25,31 determined neighbor cell relations: 1,2,3 are mutually neighbor cells; 1 is a neighbor cell of 11, 12; 2 is a neighbor cell of 21, 22,23,24,25; and 3 is a neighbor cell of 22, 25 and 31.

Figure 5:
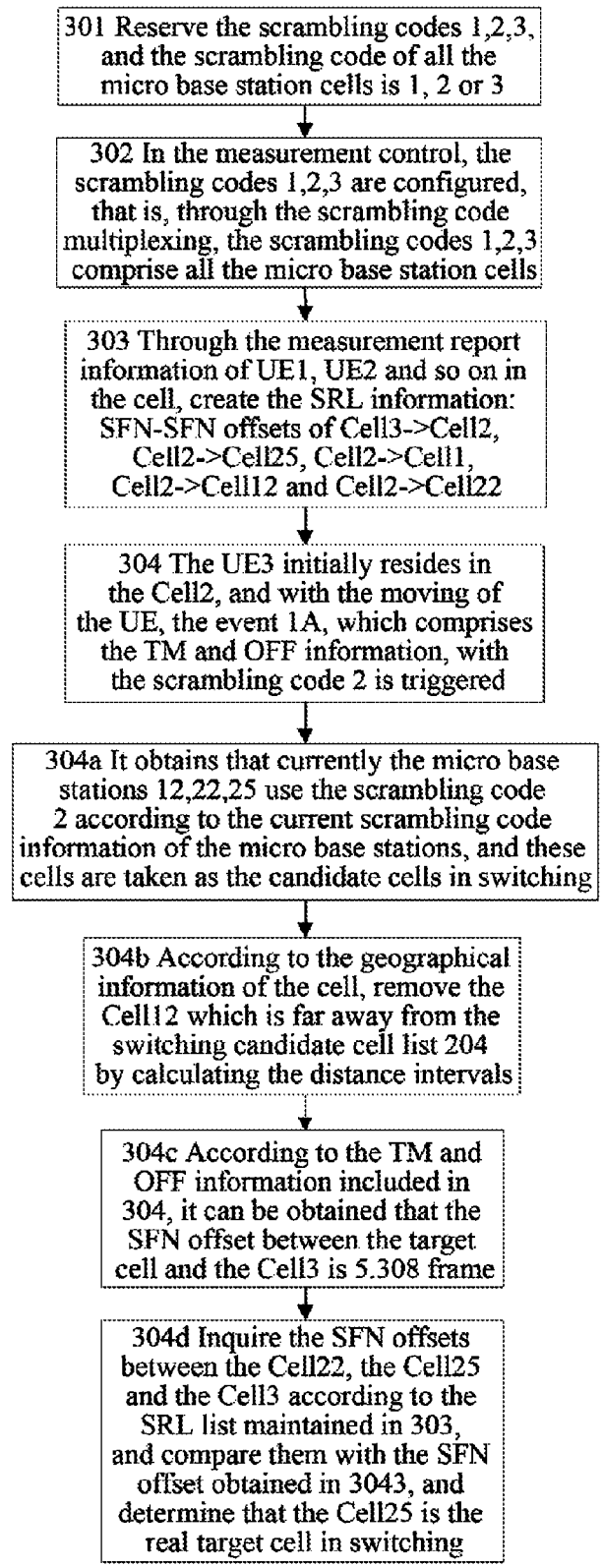
FIG. 5 is a flow chart of the cell switching in a second scenario.

DeltaFrame: 1 frame (10 ms)

coverage radius of the macro cells: 1000 m distance threshold between cells: 2000 m geographical position information of the macro and micro cells Specifically, in the present application scenario, it is to make a judgment on the target cell in switching according to indirect SFN-SFN offsets between the cells with the assistance of the geographic location information, and the cell switching process is shown in FIG. 5, comprising the following steps 301-304.

In step 301, according to the networking diagram, it is to reserve the scrambling codes PSC 1,2,3. All the micro base stations select scrambling codes in the reserved scrambling code section when establishing cells. After the establishment of micro base station cells are finished, wherein the cells 11,21,24,31 multiplex the scrambling code 1; the cells 12,22,25 multiplex the scrambling code 2; and the cell 23 multiplexes the scrambling code 3.

In step 302, for the macro cells, when filling in neighbor cells of the measurement control, it is to fill the scrambling codes 1,2,3 into the neighbor cell list. For the macro cell 1, it is equivalent to comprising the micro base station neighbor cells 11 and 12; for the macro cell 2, it is equivalent to comprising the micro base station neighbor cells 21,22,23, 24,25; for the macro cell 3, it is equivalent to comprising the micro base station neighbor cells 22,25,31.

In step 303, according to the determined neighbor cell relations as well as the statistics of the UE measurement reports in a period of time, a SFN-SFN offset table of neighbor cell can be obtained.

In this step, take the UE behavior for example to illustrate the specific process of creating the SFN-SFN offset table of neighbor cell, and the process comprises the following 303a to 303c.

in 303a, when the UE1 establishes the first link in the macro cell Cell 2, through the node synchronization, it is to obtain Frame Offset=1 frame, Chip Offset=11776chip. The UE1 reports information of the macro cell Cell3, which carries the synchronization information OFF=25, Tm=35575, and according to the equations (1) (2) (3), it can be obtained that the SFN difference of Cell3->Cell2 is 24frame+23799chip, which is rounded to 24.620frame.

in 303b, when the UE2 establishes the first link in the microcell Cell 25, it is to obtain that Frame Offset=55 frame, Chip Offset=15521. The UE2 reports information of the macro cell Cell2, which carries the synchronization information OFF=25, Tm=10752, and according to the equation in 103, it can be obtained that the SFN difference of Cell2->Cell25 is −(30frame+4769chip), which can be rounded to −30.124frame. With the same principle, it can be obtained that the SFN difference of Cell2->Cell1 is 132.882frame, the SFN difference of Cell2->Cell12 is 85.119frame, and the SFN difference of Cell2->Cell22 is −148.968frame.

in 303c, according to the measurement report reported by the UE under the jurisdiction of the network, Table 3 can be obtained as follows:

Table 3 is the SFN-SFN offset table of neighbor cell in the second scenario

|  | SFN-SFN offset |
|---|---|
| Cell3->Cell2 | 24.620 |
| Cell2->Cell25 | −30.124 |
| Cell2->Cell1 | 132.882 |
| Cell2->Cell12 | 85.119 |
| Cell2->Cell22 | −148.968 |

In step 304, the UE4 shown in FIG. 3 initially resides in the Cell3, then initiates a service, and Frame Offset=25frame, Chip Offset=33597 when establishing the first link. With the moving of the UE, the event 1A is triggered, and the corresponding scrambling code 2, and the synchronization information OFF=31 and Tm=7027 are reported. The RNC side determines the target cell in actual switching according to the information and then performs the corresponding switching action.

In this embodiment, the scrambling code reported by the UE4 is 2, and at this time a plurality of cells multiplex the scrambling code 2, therefore, it needs to determine the actual target cell according to the following 304a to 304e:

In 304a, because the cells 12,22,25 multiplex the scrambling code 2, these cells are composed into a candidate cell list.

In 304b, according to the geographical position information of the cells (macro cell Cell3, and micro cells 12,22,25), it can be obtained that the distances between the macro cell Cell3 and the micro cells 12,22,25 are respectively 2600 m, 900 m and 1300 m, and according to the pre-defined distance threshold 2000 m, the Cell12 is removed from the candidate cell list, namely it is considered that the Cell12 is far away from the Cell3 and is not a related target cell.

In 304c, according to the OFF and Tm information of the cell currently reported, it can be obtained that the SFN offset of the target cell and Cell3 is 5.308frame, that is, the SFN offset of Cell3->target cell is -5.308frame.

In 304d, the Cell3 does not have a direct SFN-SFN offset relation with the Cell22/Cell25, but the Cell3 and the Cell2, as well as the Cell2 and the Cell22/Cell25 have SFN-SFN offset relations. For this reason, it can be calculated according to the Cell2 that the SFN-SFN offsets of the Cell3 and the Cell22/Cell25 are shown in the following Table 4:

Table 4 is a list of values of SFN-SFN offsets of the remaining candidate cells and the source cell Cell3 in the second scenario

| SFN-SFN offset | |
|---|---|
| Cell3->Cell22 | Cell3->Cell2+Cell2->Cell12=-124.38 |
| Cell3->Cell25 | Cell3->Cell2+Cell2->Cell25=-5.504 |

According to the results in Table 3 and the values of SFN offsets of the Cell3 and the candidate cells in Table 4, according to the equation (4), the calculation result of each cell is shown in Table 5:

Table 5 is a list of DeltaFrame between various candidate cells and the source cell Cell2 in the second scenario

| | |(SFN Target-SFN Source)-(TargetCellSFN-SourceCellSFN)| | Is it less than DeltaFrame (1Frame) |
|---|---|---|
| Cell22 | 119.072 | No |
| Cell25 | 0.196 | Yes |

As can be seen from the abovementioned Table 5, only the Cell25 meets the conditions, and it is the actual target cell. Then the network side initiates a Cell3->Cell25 switching action.

The Third Scenario:

The networking architecture of this scenario is shown in FIG. 3, and the presetting is described as follows:

macro cells 1,2,3 micro cells 11,12,21,22,23,24,25,31 determined neighbor cell relations: 1,2,3 are mutually neighbor cells; 1 is a neighbor cell of 11, 12; 2 is a neighbor cell of 21,22,23,24,25; 3 is a neighbor cell of 22,25,31.

The macro cell 3 in the macro network has been configured with other 30 macro cells as neighbor cells.

DeltaFrame: 1 frame (10 ms)

Figure 6:
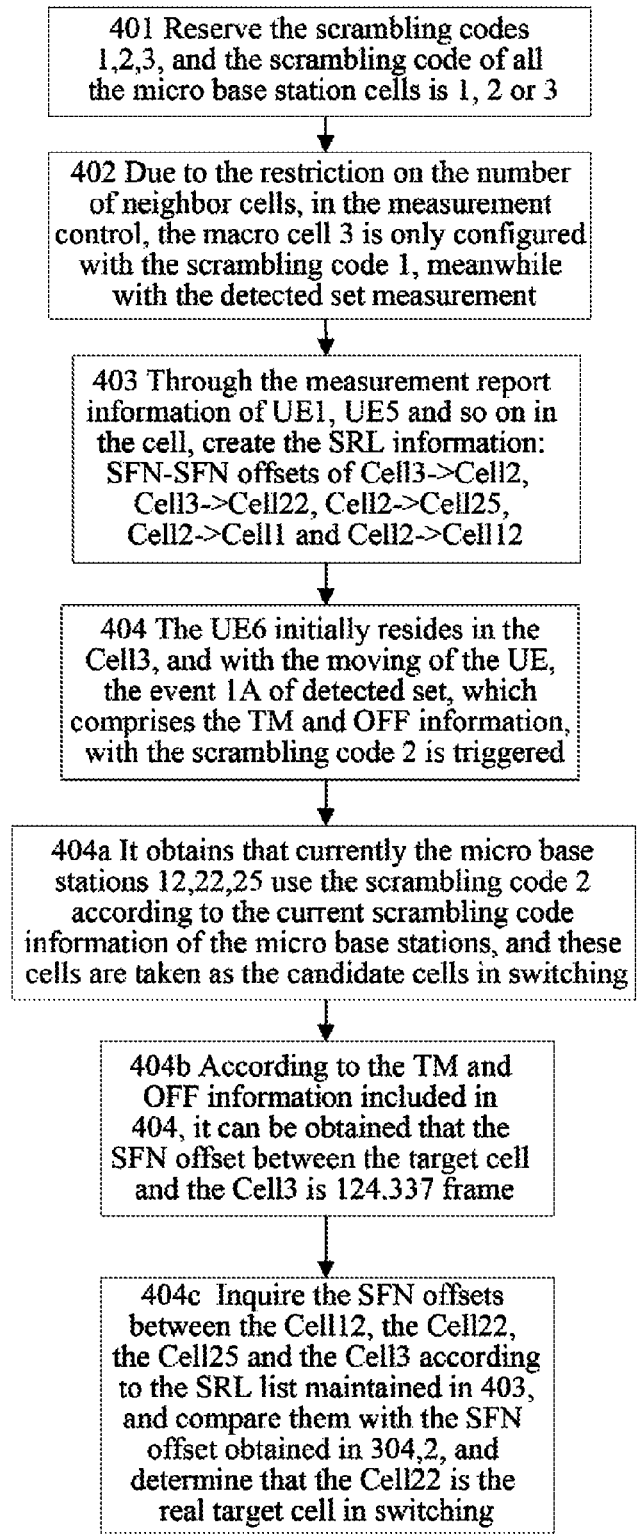
FIG. 6 is a flow chart of the cell switching in a third scenario.

Specifically, in this scenario, according to the number of neighbor cells exceeding the number of cells restricted in the protocol, the multiplexed scrambling code information is not directly configured through the measurement control, and the switching action is performed through the detected set reporting, and the cell switching process is shown in FIG. 6, comprising the following steps 401 to 404.

In step 401, according to the schematic diagram of networking, it is to reserve the scrambling codes PSC 1,2,3. All the micro base stations select scrambling codes in the reserved scrambling code section when establishing cells. After the establishment of micro base station cells is finished, wherein the cells 11,21,24,31 multiplex the scrambling code 1; the cells 12,22,25 multiplex the scrambling code 2; and the cell 23 multiplexes the scrambling code 3.

In step 402, for the macro cells, when filling in the neighbor cells of the measurement control, it is to fill the scrambling codes 1,2,3 into the neighbor cell list (wherein because the macro cell 3 has been configured with 30 neighbor cells, only the scrambling code of one micro base station can be filled in, herein the scrambling code 1 is selected to be filled in the neighbor cell list, meanwhile, the measurement of the detected set is enabled). For the macro cell 1, it is equivalent to comprising the micro base station neighbor cells 11 and 12; for the macro cell 2, it is equivalent to comprising the micro base station neighbor cells 21, 22,23,24,25; for the macro cell 3, it is equivalent to only comprising the micro base station neighbor cell 31.

In step 403, according to the determined neighbor cell relations, as well as the statistics of UE measurement reports in a period of time, the SFN-SFN offset table of neighbor cell can be obtained.

In the present embodiment, take the UE behavior as an example to illustrate the process of creating the SFN-SFN offset table of neighbor cell, comprising 403a to 403c.

in 403a, when the UE1 establishes the first link in the macro cell Cell 2, through the node synchronization, it can be obtained that Frame Offset=1 frame, Chip Offset=11776chip. The UE1 reports information of the macro cell Cell3, which carries the synchronization information OFF=25, Tm=35575, according to the equations (1) (2) (3), it can be obtained that the SFN difference of Cell3->Cell2 is 24frame+23799chip, which is rounded to 24.620frame.

in 403b, when the UE5 establishes the first link in the micro cell Cell 22, it can be obtained that Frame Offset=197 frame, Chip Offset=23981, and obtained that Frame Offset=55 frame, Chip Offset=15521. The UE5 reports information of the macro cell Cell3, which carries the synchronization information OFF=73, Tm=9850, according to the equation in 103, it can be obtained that the SFN difference of Cell3->Cell22 is -(124frame+14131chip), which is rounded to -124.368frame (equivalent to -30.124+256=225.876frame). With the same principle, it can be obtained that the SFN difference of Cell2->Cell1 is 132.882frame, and the SFN difference of Cell2->Cell12 is 85.119frame.

in 403c, according to the measurement report reported by the UE under the jurisdiction of the network, Table 6 can be obtained as follows:

Table 6 is the SFN–SFN offset table of neighbor cell in the third scenario

|  | SFN-SFN offset |
| --- | --- |
| Cell3->Cell2 | 24.620 |
| Cell3->Cell22 | −124.368 |
| Cell2->Cell25 | −30.124 |
| Cell2->Cell1 | 132.882 |
| Cell2->Cell12 | 85.119 |

In step 404, the UE6 shown in FIG. 3 initially resides in the Cell3, then initiates a service, and Frame Offset=23frame, Chip Offset=3721when establishing the first link. With the moving of the UE, the event 1A reported by the detected set is triggered, and the corresponding scrambling code 2, and the synchronization information OFF=147 and Tm=16650 are reported. The RNC side determines the target cell in actual switching according to the information and then performs the corresponding switching action.

In this embodiment, the scrambling code reported by the UE6 is 2, but at this time a plurality of cells multiplex the scrambling code 2, the RNC side cannot identify specifically which cell riggers the measurement report. In view of this, the actual target cell is judged in accordance with the following steps 404a to 404c:

In 404a, because the cells 12,22,25 multiplex the scrambling code 2, these cells are composed into a candidate cell list.

In 404b, according to the OFF and Tm information of the cell currently reported, it can be obtained that the SFN offset of the target cell and the Cell3 is 124.337frame, that is, the SFN offset of Cell3->target cell is −124.337frame.

In 404c, according to the result in Table 6 and, the value of SFN offset of the Cell3 and the target cell obtained in the step 404b, and according to the equation (4), the calculation result of each candidate cell is shown in Table 7:

Table 7 is a list of DeltaFrame of various candidate cells and the source cell Cell2 in the third Scenario

|  | \|(SFN Target-SFN Source)-(TargetCellSFN-SourceCellSFN)\| | Is it less than DeltaFrame (1Frame) |
| --- | --- | --- |
| Cell12 | 234.076 | No |
| Cell22 | 0.031 | Yes |
| Cell25 | 118.833 | No |

As can be seen from the abovementioned Table 7, only the Cell22 meets the condition, and it is the actual target cell. Then the network side initiates the Cell3->Cell25 switching action.

The Second Embodiment

The present embodiment provides a network-side device that can achieve the method of the abovementioned first embodiment, and the network-side device in the present embodiment comprises at least the following modules.

A first module multiplexes part of scrambling codes in the reserved scrambling codes to micro base station cells, and configures the multiplexed scrambling code information to a user equipment;

wherein the first module configures the scrambling code information multiplexed by the various micro base station cells to the user equipment when filling in the neighbor cell measurement control.

It should be noted that, the scrambling codes multiplexed by the first module to various micro base station cells and the number of the scrambling codes are different, moreover, the number of scrambling codes multiplexed by the first module to the micro base station cells can be greater than 31.

A second module creates a SFN–SFN relation list between various base station cells (including macro base stations and micro base station cells as well as micro base stations and micro base station cells) according to the existing determined neighbor cell relations and the cell synchronization information in a measurement report reported by the user equipment;

in the present embodiment, the specific process of the second module creating the SFN–SFN relation list between various base station cells according to the existing determined neighbor cell relations and the cell synchronization information in the measurement report reported by the user equipment is as follows:

the second module creating and updating the SFN–SFN relation list between various base stations according to the determined neighbor cell relations and the TM and OFF information in the target cell synchronization information in the measurement report reported by the user equipment.

When the second module creates and updates the SFN–SFN relation list between various base station cells, the SFN–SFN offset between every two cells can be calculated according to the following equation:

$$\text{Frame Offset}_{source} + \text{Chip Offset}_{source} = (\text{SFN}_{source} - \text{CFN}) \bmod 256 \text{ frames [chips]}$$

$$\text{OFF}_{Target} + Tm_{Target} = (\text{SFN}_{target} - \text{CFN}) \bmod 256 \text{ frames [chips]}$$

wherein, the subscript Source refers to the resident cell which currently initiates the service, and the subscript Target refers to the target cell obtained from the measurement.

a third module, when the user equipment reports the switching measurement report of the target cell, determines the target cell in actual switching and perform the corresponding switching action according to the scrambling code information in the switching measurement report, the TM and OFF information in the cell synchronization information and the SFN–SFN relation list.

Specifically, the process of the third module determining the target cell in actual switching according to the scrambling code information in the switching measurement report, the TM, OFF information in the cell synchronization information and the SFN–SFN relation list is as follows:

according to the value of scrambling code in a measurement report reported by the user equipment, composing cells corresponding to the value of scrambling code into a cell list;

calculating a SFN–SFN difference between the target cell and the source cell according to the values of TM and OFF of the target cell of the switching measurement report reported by the user equipment;

calculating the SFN time differences between the source cell Cell2 and various cells in the cell list, and determining the cells which meets the following condition as the target cells in actual switching:

$$|(\text{SFN}_{Target} - \text{SFN}_{Source}) - (\text{TargetCell}_{SFN} - \text{SourceCell}_{SFN})| < \text{DeltaFrame} \quad \text{Eq. (4)}$$

wherein $\text{SFN}_{Target} - \text{SFN}_{Source}$ is the SFN difference between the target cell and the source cell calculated according to the TM and OFF in the real-time measurement report;

$\text{TargetCell}_{SFN} - \text{SourceCell}_{SFN}$ is the SFN difference inquired by each candidate target cell in the cell list and source cell according to the SFN–SFN relation list (SRL);

DeltaFrame is the configured allowed SFN time difference.

Furthermore, the abovementioned third module further, according to the value of scrambling code in the measurement report reported by the user equipment, composes the cells corresponding to the value of scrambling code into a cell list, and then it calculates the relative distances according to the cell position information in the existing network, and removes the cells which do not meet the relative distance condition from the cell list, and then calculates the SFN time difference between the source cell Cell2 and the remaining cells in the cell list.

In some preferred embodiments, when calculating the SFN-SFN difference between the target cell and the source cell according to the values of TM and OFF of the target cell of the switching measurement report reported by the user equipment, the third module directly takes the SFN difference of the both parties saved in the SFN-SFN list if the target cell and the source cell have a direct relation; and it calculates the SFN difference of the both parties according to the shortest path method in the network topology if the target cell and the source cell do not have a direct relation.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present application is not limited to any specific form of hardware and software combinations.

The above description is only preferred embodiments of the present invention and is not used to limit the protection scope of the present document. Any modifications, equivalent replacements and improvements and so on made within the spirit and principle of the present document should be included within the protection scope of the present document.

INDUSTRIAL APPLICABILITY

The technical solution of the present application can correctly identify the specific target cell in switching by multiplexing scrambling codes and creating the SFN-SFN list information between cells when there is a relatively large number of neighbor cells, thus achieving the mobile continuity.

What is claimed is:

1. A macro base station to micro base station switching method, comprising:
   multiplexing part of scrambling codes in reserved scrambling codes to micro base station cells and configuring multiplexed scrambling code information to a user equipment;
   in accordance with existing determined neighbor cell relations as well as cell synchronization information in a measurement report reported by the user equipment, a network side creating a system frame number-system frame number (SFN-SFN) relation list between various base station cells, wherein the created SFN-SFN relation list comprises SFN-SFN offsets between macro base stations and micro base station cells as well as micro base stations and micro base station cells;
   when the user equipment reports a switching measurement report of a target cell, the network side determining a target cell in actual switching and performing a corresponding switching action according to scrambling code information in the switching measurement report, TM and OFF information in the cell synchronization information and the SFN-SFN relation list;
   wherein the process of the network side determining the target cell in actual switching according to the scrambling code information in the switching measurement report, the TM, OFF information in the cell synchronization information as well as the SFN-SFN relation list is as follows:
   composing cells corresponding to a value of scrambling code into a cell list according to the value of scrambling code in the measurement report reported by the user equipment;
   calculating a SFN-SFN difference between the target cell and a source cell according to values of TM and OFF of the target cell of the switching measurement report reported by the user equipment;
   calculating SFN time differences between various cells in the cell list and a source cell Cell2, and determining a cell which meets a following condition as the target cell in actual switching:

$$|(SFN_{Target}-SFN_{Source})-(TargetCell_{SFN}-SourceCell_{SFN})|<DeltaFrame$$

wherein $SFN_{Target}-SFN_{Source}$ is a SFN difference between the target cell and the source cell calculated according to TM and OFF in a real-time measurement report;
$TargetCell_{SFN}-SourceCell_{SFN}$ is a SFN difference inquired by each candidate target cell in the cell list and source cell according to a SFN-SFN list;
DeltaFrame is a configured allowed SFN time difference.

2. The method of claim 1, wherein
the network side configures the scrambling code information multiplexed by various micro base station cells to the user equipment when filling in a neighbor cell measurement control.

3. The method of claim 2, wherein the network side creating a SFN-SFN relation list between macro base stations and micro base station cells in accordance with the existing determined neighbor cell relations and the cell synchronization information in the measurement report reported by the user equipment refers to:
the network side creating and updating the SFN-SFN relation list between the macro base stations and the micro base station cells in accordance with determined neighbor cell relations between cells and the TM and OFF information in target cell synchronization information in the measurement report reported by the user equipment.

4. The method of claim 1, wherein the network side creating a SFN-SFN relation list between macro base stations and micro base station cells in accordance with the existing determined neighbor cell relations and the cell synchronization information in the measurement report reported by the user equipment refers to:
the network side creating and updating the SFN-SFN relation list between the macro base stations and the micro base station cells in accordance with determined neighbor cell relations between cells and the TM and OFF information in target cell synchronization information in the measurement report reported by the user equipment.

5. The method of claim 4, wherein when the network side creating and updating the SFN-SFN relation list between the macro base stations and the micro base station cells, a SFN-SFN offset between every two cells is calculated according to following equations:

Frame Offset$_{source}$+Chip Offset$_{source}$=(SFN$_{source}$−CFN)mod 256 frames[chips]

OFF$_{Target}$+Tm$_{Target}$=(SFN$_{target}$−CFN)mod 256 frames [chips]

wherein a subscript Source refers to a resident cell which currently initiates services, and a subscript Target refers to a target cell obtained from measurement.

6. The method of claim 1, wherein the method further comprises:
after composing cells corresponding to a value of scrambling code into a cell list according to the value of scrambling code in the measurement report reported by the user equipment, the network side calculating relative distances according to cell position information of a existing network and removing cells which do not meet a relative distance condition from the cell list, and then calculating SFN time difference between the source cell Cell2 and remaining cells in the cell list.

7. The method of claim 1, wherein
when calculating the SFN-SFN difference between the target cell and the source cell according to the values of TM and OFF of the target cell of the switching measurement report reported by the user equipment, if the target cell and the source cell have a direct relation, the SFN difference between the target cell and the source cell saved in the SFN-SFN list is directly taken; if the target cell and the source cell do not have a direct relation, the SFN difference between the target cell and the source cell is calculated according to a shortest path method in a network topology.

8. The method of claim 1, wherein the number of the scrambling codes and the scrambling codes multiplexed to various micro base station cells are different.

9. The method of claim 1, wherein the number of the scrambling codes multiplexed to the micro base station cells is greater than 31.

10. A network-side device, comprising:
a first module, configured to: multiplex part of scrambling codes in reserved scrambling codes to micro base station cells, and configure multiplexed scrambling code information to a user equipment;
a second module, configured to: create a SFN-SFN relation list between various base station cells according to existing determined neighbor cell relations and cell synchronization information in a measurement report reported by the user equipment, wherein the created SFN-SFN relation list comprises SFN-SFN offsets between macro base stations and micro base station cells as well as micro base stations and micro base station cells;
a third module, configured to: when the user equipment reports a switching measurement report of a target cell, determine a target cell in actual switching and perform a corresponding switching action according to scrambling code information in the switching measurement report, TM and OFF information in the cell synchronization information as well as the SFN-SFN relation list;
wherein the process of the third module being configured to determine the target cell in actual switching according to the scrambling code information in the switching measurement report, the TM, OFF information in the cell synchronization information as well as the SFN-SFN relation list is as follows:
composing calls corresponding to a value of scrambling code into a cell list according to the value of scrambling code in the measurement report reported by the user equipment;
calculating a SFN-SFN difference between the target cell and a source cell according to values of TM and OFF of the target cell of the switching measurement report reported by the user equipment;
calculating SFN time differences a source cell Cell2 and various cells in the cell list, and determining a cell which meets a following condition as the target cell in actual switching:

|(SFN$_{Target}$−SFN$_{Source}$)−(TargetCell$_{SFN}$−SourceCell$_{SFN}$)|<DeltaFrame wherein SFN$_{Target}$−SFN$_{Source}$ is a SFN difference between the target cell and the source cell calculated according to TM and OFF in a real-time measurement report;
TargetCell$_{SFN}$−SourceCell$_{SFN}$ is a SFN difference inquired by each candidate target cell in the cell list and the source cell according to a SFN-SFN list;
DeltaFrame is a configured allowed SFN time difference.

11. The network-side device of claim 10, wherein
the first module is configured to: configure scrambling code information multiplexed by various micro base station cells to the user equipment when filling in a neighbor cell measurement control.

12. The network-side device of claim 11, wherein the second module being configured to create a SFN-SFN relation list between macro base stations and micro base station cells in accordance with the existing determined neighbor cell relations and the cell synchronization information in the measurement report reported by the user equipment refers to:
the second module creating and updating the SFN-SFN relation list between the macro base stations and the micro base station cells in accordance with determined neighbor cell relations between cells and TM and OFF information in target cell synchronization information in the measurement report reported by the user equipment.

13. The network-side device of claim 10, wherein the second module being configured to create a SFN-SFN relation list between macro base stations and micro base station cells in accordance with the existing determined neighbor cell relations and the cell synchronization information in the measurement report reported by the user equipment refers to:
the second module creating and updating the SFN-SFN relation list between the macro base stations and the micro base station cells in accordance with determined neighbor cell relations between cells and TM and OFF information in target cell synchronization information in the measurement report reported by the user equipment.

14. The network-side device of claim 13, wherein the second module is configured to: when creating and updating the SFN-SFN relation list between the macro base stations and the micro base station cells, calculate a SFN-SFN offset between every two cells according to a following equation:

$$\text{Frame Offset}_{source} + \text{Chip Offset}_{source} = (\text{SFN}_{source} - \text{CFN}) \bmod 256 \text{ frames [chips]}$$

$$\text{OFF}_{Target} + Tm_{Target} = (\text{SFN}_{target} - \text{CFN}) \bmod 256 \text{ frames [chips]}$$

wherein a subscript Source refers to a resident cell which currently initiates services, and a subscript Target refers to a target cell obtained from measurement.

15. The network-side device of claim 10, wherein the third module is further configured to: after composing the cells corresponding to the value of scrambling code into the cell list according to the value of scrambling code in the measurement report reported by the user equipment, calculate relative distances according to cell position information in a existing network and remove cells which do not meet a relative distance condition from the cell list, and then calculate a SFN time difference between the source cell Cell2 and remaining cells in the cell list.

16. The network-side device of claim 10, wherein the third module is further configured to, when calculating the SFN–SFN difference between the target cell and the source cell according to the values of TM and OFF of the target cell of the switching measurement report reported by the user equipment, if the target cell and the source cell have a direct relation, directly take the SFN difference between the target cell and the source cell saved in the SFN–SFN list; if the target cell and the source cell do not have a direct relation, calculate the SFN offset between the target cell and the source cell according to a shortest path method in a network topology.

17. The network-side device of claim 10, wherein the number of the scrambling codes and the scrambling codes multiplexed by the first module to various micro base station cells are different.

18. The network-side device of claim 10, wherein the number of the scrambling codes multiplexed by the first module to the micro base station cells is greater than 31.

* * * * *